United States Patent
Barthel

(10) Patent No.: US 9,264,588 B2
(45) Date of Patent: Feb. 16, 2016

(54) THEFT PROTECTION DEVICE FOR A CAMERA UNIT

(75) Inventor: Joachim Barthel, Essen (DE)

(73) Assignee: HUF HULSBECK & FURST GMBH & CO. KG, Velbert (DE)

(*) Notice: Subject to any disclaimer, the term of this patent is extended or adjusted under 35 U.S.C. 154(b) by 302 days.

(21) Appl. No.: 13/882,796

(22) PCT Filed: Nov. 14, 2011

(86) PCT No.: PCT/DE2011/075271
§ 371 (c)(1),
(2), (4) Date: Nov. 4, 2013

(87) PCT Pub. No.: WO2012/065604
PCT Pub. Date: May 24, 2012

(65) Prior Publication Data
US 2014/0043528 A1    Feb. 13, 2014

(30) Foreign Application Priority Data
Nov. 16, 2010 (DE) .......... 10 2010 060 603

(51) Int. Cl.
*H04N 5/225* (2006.01)
*B60R 11/04* (2006.01)
*B60R 11/00* (2006.01)

(52) U.S. Cl.
CPC .............. *H04N 5/2251* (2013.01); *B60R 11/04* (2013.01); *B60R 2011/0092* (2013.01); *B60R 2011/0094* (2013.01)

(58) Field of Classification Search
USPC ........................................................ 348/373
See application file for complete search history.

(56) References Cited

U.S. PATENT DOCUMENTS

| 2009/0128687 A1 | 5/2009 | Woo |
| 2010/0040361 A1* | 2/2010 | Schuetz .......................... 396/428 |
| 2010/0073478 A1 | 3/2010 | Kalous |

FOREIGN PATENT DOCUMENTS

| DE | 102 04 764 A1 | 8/2003 |
| DE | 10 2006 048373 A1 | 4/2008 |

(Continued)

OTHER PUBLICATIONS

International Search Report under date of mailing of Apr. 4, 2012 in connection with PCT/DE2011/075271.

*Primary Examiner* — Roberto Velez
*Assistant Examiner* — Stephen Coleman
(74) *Attorney, Agent, or Firm* — Quarles & Brady LLP

(57) ABSTRACT

The invention relates to a theft protection device for a camera unit (20) that is arranged on a movable protection element (11) of a motor vehicle, said camera unit (20) being used to detect images of the outer area (5). The protection element (11) can be moved between a closed position (1) and an open position (2). In the closed position (1), the camera unit (20) is in the idle position (3) and in the open position (2), the camera unit (20) is in the operational position (4). The protection element (11) comprises a receiving unit (10) for the camera unit (20) on the inner side, the side of the protection element (11) facing away from the outer area (5), a safety element (30) being arranged on the receiving element (10) which safety element reliably maintains the camera unit (20) in the receiving element (10). At least one securing means (14) secures the safety element (30) to the inner side of the protection element (11), and the securing means (14) is arranged at such a distance from the protection element (11) that the securing means (14) cannot be tampered with when the protection element (11) is in the open position (2).

19 Claims, 3 Drawing Sheets

(56) References Cited

FOREIGN PATENT DOCUMENTS

Figure 1:
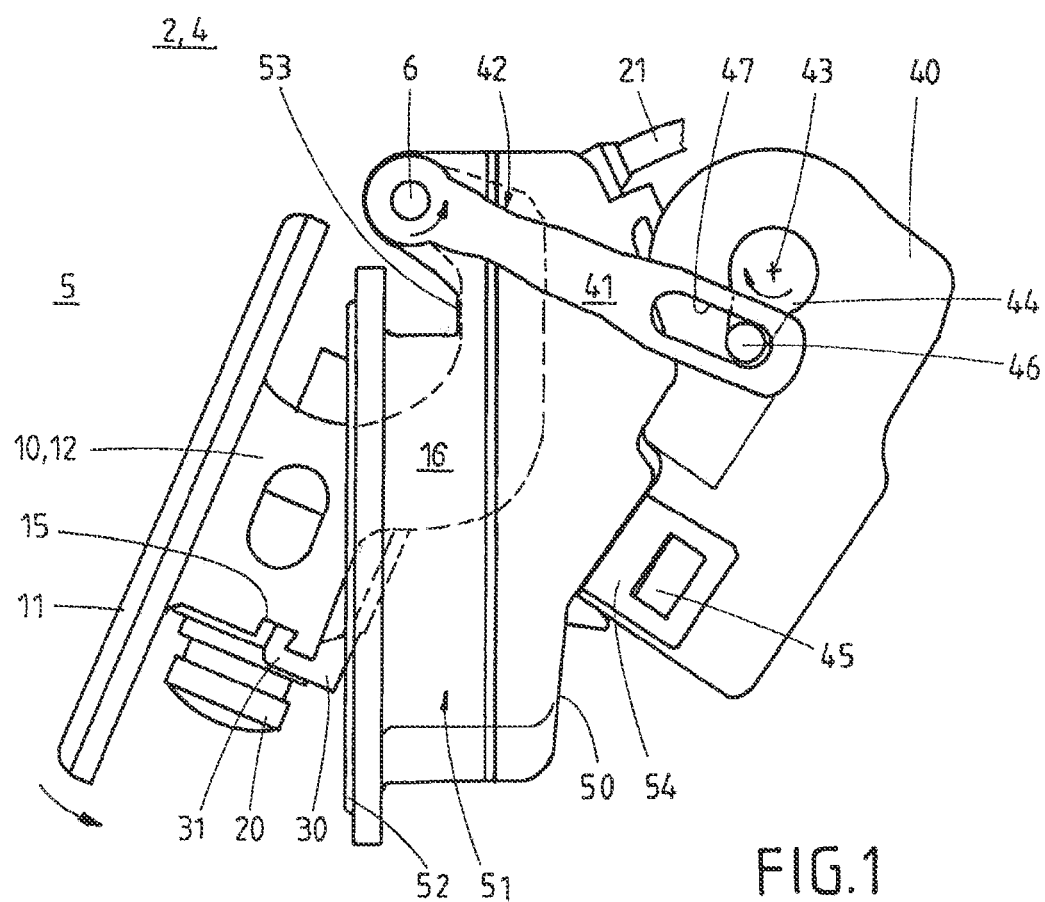

| DE | 10 2008 008656 A1 | 8/2009 |
| DE | 10 2010 001108 A1 | 7/2011 |
| EP | 2 144 435 A2 | 1/2010 |
| JP | 2003 291783 A | 10/2003 |
| JP | 2004 216958 A | 8/2004 |
| JP | 2004 216976 A | 8/2004 |

* cited by examiner

THEFT PROTECTION DEVICE FOR A CAMERA UNIT

CROSS-REFERENCE TO RELATED APPLICATIONS

This application represents the national stage entry of PCT International Application No. PCT/DE2011/075271 filed Nov. 14, 2011 and claims the benefit of German Patent Application No. 10 2010 060 603.0 filed Nov. 16, 2010. The contents of both of these applications are hereby incorporated by reference as if set forth in their entirety herein.

The invention relates to a theft protection device for a camera unit which is arranged on a movable protection element of a motor vehicle and the camera unit serves for detecting images of the outer area.

Devices for monitoring the rear area of motor vehicles are sufficiently well known. Thus, a device for monitoring the rear area and/or front area of a motor vehicle being parked is disclosed, for example, in DE 4336288, said device having a video camera installed in the rear and/or in the front of the vehicle. A viewing and monitoring device in the field of vision of the vehicle driver is connected to said video camera, said viewing and monitoring device being provided with a screen. The video camera is provided with means for pivoting, depending on electrical control signals, and is provided with an object-referenced image sharpness control unit. It has proved to be a drawback that the camera unit, which constitutes a relatively expensive unit, is able to be easily stolen.

It is the object of the invention to overcome the aforementioned problem and to install the camera unit securely on the motor vehicle but at the same time not to limit the functionality and the monitoring range.

To achieve this object, a device is proposed with all the features of claim 1. Preferred developments are set forth in the dependent claims.

According to the invention, a theft protection device for a camera unit is provided, said theft protection device being arranged on a movable protection element of a motor vehicle and the camera unit serving for detecting images of the outer area of the motor vehicle. In this case, the protection element is able to be moved between a closed position and an open position. In the closed position, the camera unit is in the resting position. In the open position, however, the camera unit is in the operating position in which images of the outer area are detected. The protection element has a receiver for the camera unit on the inside, on the side of the protection element remote from the outer area. A securing element, which reliably holds the camera unit in the receiver, is arranged on the receiver. Additionally, at least one fastening means is provided, whereby the securing element is fastened to the inside of the protection element and the fastening means is spaced apart from the protection element such that in the open position of the protection element the fastening means is not able to be tampered with. The fastening means may not be reached by an unauthorized person manually or by means of a tool, in order to release the fastening means in the open position of the protection element for the purpose of stealing the camera unit. The securing element may be fastened, for example, directly to the receiver in which the camera unit is located. In a preferred embodiment of the invention, the receiver, the securing element as well as the protection element at least partially surround the camera unit. Although the securing element may be directly fastened to the receiver, the securing element reliably holds the camera unit in the receiver and effectively prevents the camera unit from being able to be stolen from the receiver. The camera unit is preferably fastened rigidly in the receiver, wherein the receiver is able to be connected integrally to the protection element. In the closed position of the protection element, the camera unit is fully protected by the protection element inside the motor vehicle. When the protection element moves from the closed position into the open position, the camera unit correspondingly moves therewith, as a rigid connection is advantageously present between the camera unit and the receiver as well as the inside of the protection element. The fastening means is additionally at a distance from the protection element and from the relevant region for image detection of the camera unit, so that the monitoring range for the image detection is not limited.

In a further embodiment of the invention, the receiver may comprise two walls which laterally encompass the camera unit. Thus, it is conceivable that the inside of the protection element as well as the two walls of the receiver form a U-shaped profile for the camera unit. The securing element is advantageously arranged on the receiver such that the camera unit is fully encompassed, in particular is surrounded, by the securing element, the receiver and the protection element. The walls of the receiver serve to protect the camera unit from external influences such as soiling, damage, vandalism or theft.

It is also conceivable that the securing element has at least one retaining element which engages in the receiver, in particular in at least one wall of the receiver. Thus, the securing element is firstly able to be fastened via the fastening means to the protection element and/or to the camera unit and/or the receiver. Secondly, a further additional fastening of the securing element takes place via the retaining element on the receiver, whereby the security of the camera unit in the receiver is increased at the same time.

Advantageously, the camera unit is able to bear against walls of the receiver, on the inside against the protection element as well as against the securing element, wherein the camera unit protrudes through an opening, wherein the opening is formed by the walls, the protection element and by the securing element. Expediently, the camera unit protrudes with its optical part for image detection, in particular the lens, through the opening in order to achieve satisfactory image detection of the outer area in the open position of the protection element.

It is also conceivable that the securing element and/or the receiver is adapted to the outer contour of the camera unit such that the camera unit is not able to be removed from the opening. For example, it is possible for the camera unit to be designed with a shoulder which bears against a seat of the securing element. The seat of the securing element in this case serves as a tapered portion and/or narrowed portion in the direction of the opening, through which the camera unit protrudes. Thus, the shoulder on the camera unit and the seat on the securing element prevent the camera unit from being able to be stolen from the receiver by being tampered with in the direction of the opening. The seat of the securing element in this case serves as a type of security stop which prevents the camera unit from being pulled out further from the receiver.

Preferably the fastening means may have at least one first fastening means on the receiver and/or a second fastening means, wherein in particular the first and the second fastening means cooperate such that the securing element is able to be fastened in the receiver. In this case, the fastening means is able to be used to connect, by fastening, the securing element to the receiver, to the wall of the receiver, to the camera unit or to the protection element.

Preferably, the first fastening means may be a screw thread which is incorporated in the receiver, wherein the second fastening means engages into the screw thread as a screw element which extends through a bore of the securing element. It is also conceivable that the first and the second fastening means are designed as latching means, whereby the entire device may be rapidly mounted. Alternatively, the fastening means may also effect a fastening of the securing element to the receiver, to the wall of the receiver, to the camera unit or directly to the protection element by a material connection.

Expediently, on the side opposing the retaining element the securing element may be designed with two arms, through which the first and/or the second fastening means extends. In this case, the securing element may specifically have a Y-shape due to the two arms which serve to define two fastening points for the first fastening means and the second fastening means.

According to a further preferred development of the invention, at least two retaining elements may be provided, said retaining elements positively engaging in the receiver, in particular two retaining elements may be configured in a hook shape an the securing element, said retaining elements engaging in one respective recess of the receiver. Said hook-shaped retaining elements form a reliable positive connection with the receiver, in particular with the walls of the receiver which in each case are designed with a recess for a retaining element.

In a preferred embodiment of the invention, proceeding from the receiver, at least one pivoting element may extend as far as a rotational axis of the protection element, in particular the receiver may form with the pivoting element a one-piece component. The receiver with its walls may be designed from the same material as the pivoting element and/or the protection element. At the same time, the camera unit is held immovably in the receiver so that when moving the protection element between the closed position and the open position, the camera unit also pivots about the rotational axis.

It is conceivable that a drive is provided, said drive driving a mechanism which is operatively connected to the pivoting unit. In this case, the drive may be a linear drive or a rotary drive. The drive may, for example, act on the pivoting element, on the camera unit, on the receiver or directly on the protection element. The drive may, for example, have an actuating drive which, for example, performs a linear lifting movement in order to drive the mechanism. The drive may additionally have a motor, in particular an electric motor, and/or be configured as a motor, in particular as an electric motor. Advantageously, the motor and/or the mechanism may also be designed to be self-locking, so that a manual movement of the protection element connected to the motor is not possible. In other words, for example, if the protection element is pulled, the mechanism which acts in a self-locking manner and/or the motor configured to be self-locking prevents a movement of the protection element, and thus also the movement of the camera unit. Thus a motor configured to be self-locking, as well as the mechanism configured to be self-locking, represent effective theft protection for the camera unit in the closed position of the protection element.

In an embodiment of the invention, the mechanism may have a lever which is movably mounted about the rotational axis, wherein at the same time the lever is connected fixedly in terms of rotation to the pivoting element. Alternatively and/or additionally, the drive may be designed as a rotary drive which is able to rotate partially clockwise or counter-clockwise, for example, via a crank. The crank may act on the lever or on the pivoting element so that a rotational movement of the lever and/or of the pivoting element may be achieved via the movement of the crank.

Preferably, the protection element may have a decorative element and/or a logo on the outside. A logo within the meaning of the invention is, in particular, an emblem for a motor vehicle brand, in particular an automobile brand. In this case, the logo may be configured to be two-dimensional or three-dimensional. Advantageously, the logo is fully visible for the observer in every position of the protection element.

Advantageously, at least one stop for the mechanism may be provided for the open position and/or for the closed position, wherein in particular in the closed position the stop is formed by the housing on which the protection element acts, and/or in the open position the stop is formed by the housing on which the pivoting element acts. A seal may be arranged on the protection element and/or on the housing, where in the closed position the seal prevents environmental influences affecting the camera unit in the resting position.

Expediently, a housing fastened to the vehicle body may be provided, said housing having an indentation in which the camera unit is in the resting position. In the closed position of the protection element and in the resting position of the camera unit, the camera unit is protected inside the indentation of the housing. In the open position of the protection element, however, the camera unit protrudes with at least a substantial part thereof out of the indentation of the housing in order to be able to detect images of the outer area in an effective manner.

The ease of assembly may be enhanced by the drive and/or a part of the mechanism, in particular the lever, being arranged on the outside of the housing. In other words, the drive as well as the mechanism are fastened inside the motor vehicle, namely in the non-visible region on the inside, but the fastening takes place on the outside of the housing. Advantageously, the drive is fastened to the housing via a latching connection and/or via a positive and/or non-positive connection. Additionally, it may be advantageous if the outer contour of the drive is at least partially adapted to the geometric contour of the housing so that a compact overall construction may be achieved, which requires a small constructional volume. Preferably, the drive and/or the lever may be arranged on the outside of the housing.

The idea of the invention, relates to a motor vehicle which may be configured as a heavy goods vehicle or a passenger motor vehicle. The motor vehicle may also be a boat and/or a ship. It is also conceivable that the motor vehicle is configured as a utility vehicle, for example an excavator, a tracked vehicle, a crane, etc. It is advantageous, in particular, if the motor vehicle has two or more such devices. In this case, a plurality of devices may be coupled together so that they may be operated in parallel with one another. The device may also have a mechanism which has at least two pivoting elements and/or levers spaced apart from one another.

Figure 2:
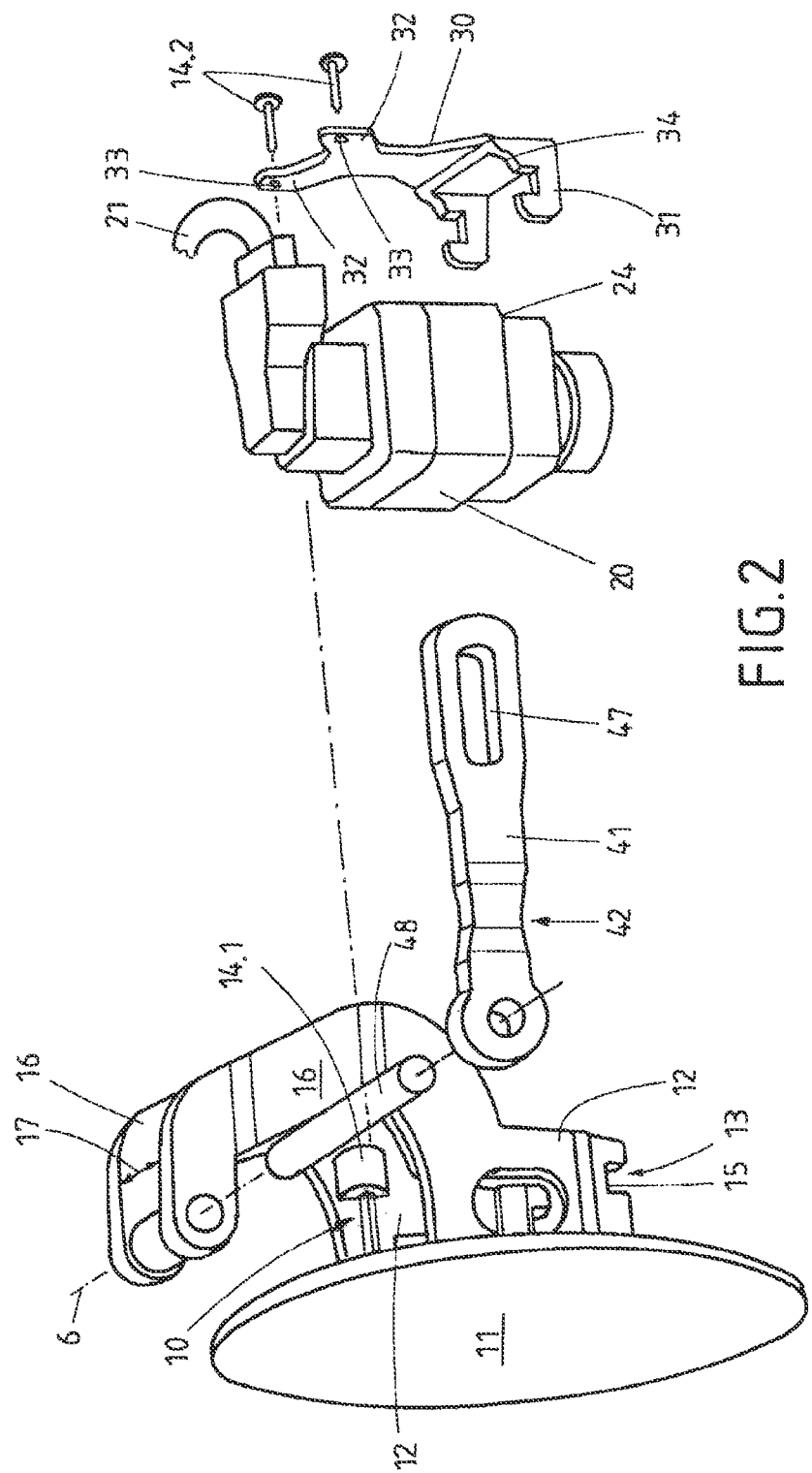
Figure 3:
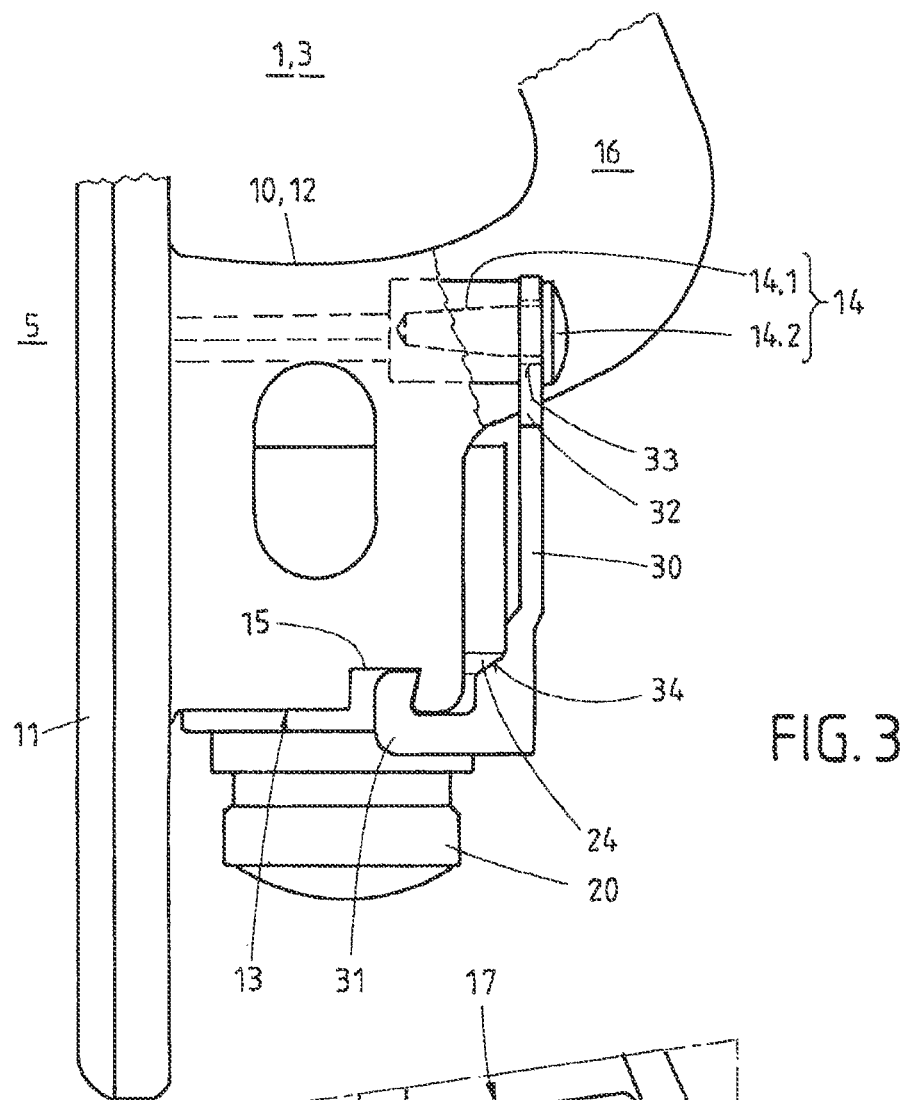
Figure 4:
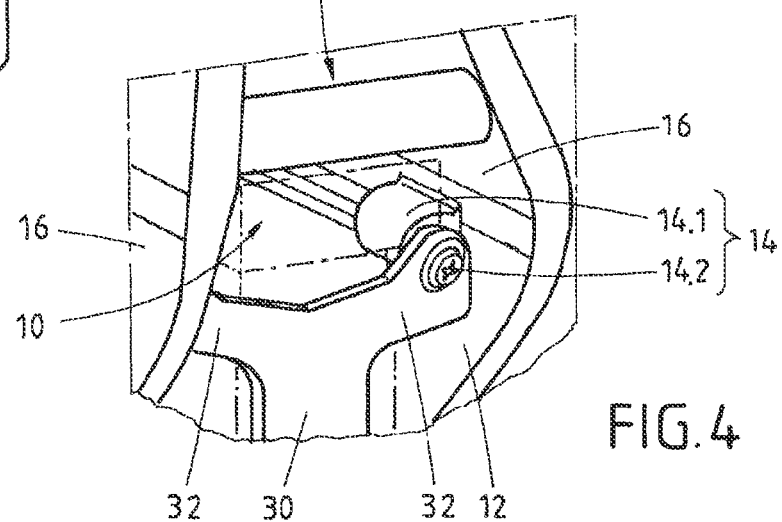

Further advantages, features and details of the invention are revealed from the following description in which an exemplary embodiment of the invention is described in detail with reference to the drawings. In this case, the features mentioned in the claims and in the description in each case may be essential for the invention individually per se or in any combination. In the drawings:

FIG. 1 shows a schematic side view of a device according to the invention for a motor vehicle, in which the camera unit is located in the operating position, FIG. 2 shows an exploded view of FIG. 1, FIG. 3 shows the essential part of the device shown in FIG. 1, wherein the camera unit is in the resting position and FIG. 4 shows a further detailed view of the device according to the invention as claimed in FIG. 1.

Elements having the same function and mode of operation are provided in each case in FIGS. 1 and 4 with the same reference numerals.

A theft protection device according to the invention for a camera unit 20 is shown in FIG. 1, wherein the camera unit is fixedly fastened to a movable protection element 11. The protection element 11 is a type of cover which is rotatably mounted on the motor vehicle. In the present exemplary embodiment, the protection element 11 is rotatably mounted about the axis 6, wherein the protection element 11 is able to be moved between an open position 2 which is shown in FIG. 1 and a closed position 1 which is shown in FIG. 3. The camera unit 20 serves for detecting images of the outer area 5 of the motor vehicle, wherein in the open position 2 of the protection element 11, the camera unit 20 is located in the operating position 4 and is actively able to undertake image detection of the outer area 5.

In the closed position 1 according to FIG. 3, in contrast, the camera unit 20 is in its resting position 3 in which the camera unit 20, for example, may be deactivated.

The protection element 11 has a receiver 10 for the camera unit 20 on the inside, on the side of the protection element 11 remote from the outer area 5. As FIG. 2 also illustrates, in the present exemplary embodiment the receiver 10 has two walls 12 oriented parallel to one another, between which the camera unit 20 may be arranged. In the present exemplary embodiment, the receiver 10 together with its walls 12 are integrally connected to the protection element 11 and thus form a one-piece component. A securing element 30 is provided so that the camera unit 20 is reliably held in the receiver 10. Additionally, fastening means 14 are provided, the securing element 30 being able to be fastened to the inside of the protection element 11 by means of said fastening means. In the present exemplary embodiment, a plurality of fastening means 14 are provided and namely a first fastening means 14.1 as a screw thread, which is located in the receiver 10 and/or in the wall 12 of the receiver 10. Each wall 12 in this case has a screw thread 14.1. Additionally, a second fastening means 14.2 is provided, said second fastening means, as a screw 14.2, cooperating with the screw thread 14.1. As is shown in FIG. 2 and FIG. 4, the securing element 30 in the upper region has two arms 32 which in each case are provided with a bore 33.

In each case, a screw element 14.2 extends through said bores 33, said screw element at the same time being reliably held in the screw thread 14.1 of the receiver 10. Thus, the securing element 30 is reliably fastened to the receiver 10.

Additionally, the securing element 30 has two retaining elements 31 which engage in the receiver 10, in particular in at least one wall 12. In a specific exemplary embodiment according to FIG. 1 to FIG. 4, the retaining elements 31 engage positively in the receiver 10, wherein the retaining elements 31 are configured in a hook shape on the securing element 30, and engage in one respective recess 15 of the wall 12. As visible in FIG. 2 and FIG. 3, the securing element 30 has a seat 34 against which a shoulder 24 of the camera unit 20 bears. Through this seat 34 the cross section tapers in the direction of the opening 13 of the receiver 10. As a result, it is achieved that in the mounted state of the camera unit 20 the securing element 30 with the fastening means 14 ensure reliable retention in the receiver 10 so that said camera unit is protected against theft. As the fastening means 14 are thus spaced apart from the protection element 11 and in the open position 2 of the protection element 11 are not able to be reached from the outer area 5 in order to be manipulated, potential theft of the expensive camera unit 20 is virtually excluded.

As shown in FIG. 1 and FIG. 3, the camera unit 20 bears against the walls 12 of the receiver 10, on the inside against the protection element 11 and against the securing element 30. In this case, the camera unit 20 protrudes through the opening 13, wherein the opening 13 is formed by the walls 12, the protection element 11 and by the securing element 30. So that the protection element 11 is able to be moved between the closed position 1 and the open position 2, a drive 40 is provided according to FIG. 1, said drive driving a mechanism, about which details are provided hereinafter. Proceeding from the receiver 10, two pivoting elements 16 extending parallel to one another extend as far as the rotational axis 6 of the protection element 11. In this case, the receiver 10 with its walls 12 and the pivoting elements 16 form a one-piece component. The drive 40 of FIG. 1 in this case is operatively connected to the pivoting elements 16, wherein the mechanism in the present exemplary embodiment has a lever 41 which is movably mounted about the rotational axis 6. At the same time, the lever 41 with the pivoting elements 16 are connected together fixedly in terms of rotation. The drive 40 is configured as a rotary drive, wherein the drive 40 has a crank 44 rotatably mounted about a shaft 43 which is operatively connected to the lever 41. The crank 44 has a cam 46 which is able to be moved eccentrically to the shaft 43. The cam 46 is movably mounted in a slot 47 of the lever 41. Proceeding from FIG. 1, the protection element 11 is moved from its open position 2 in the direction of the closed position 1 by the drive 40 rotating the crank 44 clockwise. At the same time, the cam 46 moves along the slot 47 in the direction of the rotational axis 6, wherein at the same time the lever 41 is pivoted counterclockwise about the rotational axis 6. As the lever 41 is connected fixedly in terms of rotation via the shaft 48 according to FIG. 2 to the pivoting elements 16, the protection element 11 performs a rotational movement counterclockwise about the rotational axis 6, whereby the protection element 11 is moved in the direction of the closed position 1.

As indicated in FIG. 1, a housing 50 fastened to the vehicle body is provided, said housing comprising an indentation 51 in which the camera unit 20 is located in the resting position 3. The fastening means 14 protrude in the open position 2 of the protection element 11 into the indentation 51 of the housing 50, so that unauthorized access to the fastening means 14 is excluded. Additionally, the camera unit 20 in its operating position 4 is also not able to be pulled out of the receiver 10, as the securing element 30 with its seat 34 prevents the camera unit 20 from being moved out of the opening 13.

So that the drive 40 is able to be mounted easily on the housing 50, the housing 50 comprises latching means 54 which cooperate with counter-latching means 45 of the drive 40. In the present exemplary embodiment, the latching means 54 of the housing 50 is provided with an opening into which the counter-latching means 45 of the drive 40 positively engage. So that a compact overall construction may be achieved, the rear face of the housing 50 is adapted to the geometry of the drive 40. As may be identified from FIG. 1, the drive 40 as well as the lever 41 are arranged on the outside of the housing 50. The shaft 48 of FIG. 2 protrudes in this case from the housing 50, so that the lever 41 is able to act on the axis 6.

In each case a stop 52, 53 is provided for the open position 2 and for the closed position 1. In the closed position 1, the protection element 11 comes into contact with the stop 52 which is arranged on the housing 50. In the open position 2, the pivoting element 16 acts on the stop 53 which is formed by the housing 50 inside the indentation 51.

So that in the closed position 1 the indentation 51 is reliably sealed from the outer area 5, a seal may be arranged on the inside of the protection element 11 or on the stop 52 of the housing 50. The camera unit 20 is additionally connected via a cable 21, shown in FIG. 1, to the on-board electronic system of the motor vehicle. It is particularly advantageous if the cable 21 to the camera unit 20 moves with the movement of the protection element 11 between its positions 1, 2.

In order to prevent potential rattling noise and/or vibrations on the protection element 11 in any position 1, 2, the lever 41 has a region 42 which has a greater resilience than the remainder of the lever 41. Shortly before the open position 2 and the closed position 1, a slight resilient deformation of the lever 41 occurs, whereby in the subsequent open position 2 and the closed position 1, the protection element 11 is rigidly held in its position. The region 42 in the present exemplary embodiment according to FIG. 1 and FIG. 2 is narrowed, whereby in this region 42 a greater resilience occurs than in the remainder of the lever 41.

Preferably, at least one sensor element, not specifically shown, may be provided which is able to detect both positions 1, 2 of the camera unit 20. In this case, different types of sensor are conceivable, for example resistive sensors, inductive sensors, magnetic field sensors, capacitive sensors, piezoelectric sensors or optoelectric sensors. The sensor element may, for example, be arranged in the indentation 51, on the camera unit 20, on the lever 41, on the protection element 11, on the pivoting element 16 or in the free space 17 which is formed by the space between two walls 12. If, for example, the camera unit 20 is in its respective position 1, 2, the sensor element detects this, whereby a signal is transmitted to the drive 40 which, for example, is deactivated.

LIST OF REFERENCE NUMERALS

1 Closed position
2 Open position
3 Resting position
4 Operating position
5 Outer area
6 Rotational axis
10 Receiver
11 Protection element.
12 Wall
13 Opening
14 Fastening means
14.1 First fastening means, screw thread
14.2 Second fastening means, screw
15 Recess
16 Pivoting element
17 Free space
20 Camera unit
21 Cable
24 Shoulder
30 Securing element
31 Retaining element
32 Arm
33 Bore
34 Seat
40 Drive
41 Lever
42 Resilient region
43 Shaft
44 Crank
45 Counter-latching means
46 Cam
47 Slot
48 Shaft
50 Housing
51 Indentation
52 Stop for 1
53 Stop for 2
54 Latching means

The invention claimed is:

1. A theft protection device for a camera unit of a motor vehicle, said theft protection device comprising:
    a housing;
    a movable protection element on which a camera unit for detecting images of an outer area can be arraned, wherein the protection element is movable relative to the housing between a closed position and an open position, in the closed position the camera unit is in a resting position and the movable protection element covers an opening in the housing, and in the open position the movable protection unit uncovers the opening in the housing and the camera unit is in an operating position protruding at least partially through the opening in the housing;
    a receiver for the camera unit fixed to an inside surface of the protection element, said inside surface of the protection element being on a side of the protection element facing an interior of the housing when said protection element is in said closed position, said receiver being movable with said protection element when said protection element moves between said closed position and said open position;
    a securing element, which reliably holds the camera unit in the receiver, is arranged on the receiver; and
    at least one fastening element fastening the securing element relative to the inside surface of the protection element, wherein the fastening element is spaced apart from the protection element, such that in the open position of the protection element the fastening element is not able to be tampered with through the opening in the housing;
    wherein the receiver includes two walls which encompass the camera unit received by the receiver.

2. The device as claimed in claim 1, in which the receiver is connected integrally to the protection element.

3. The device as claimed in claim 1, in which the securing element has at least one retaining element which engages at least one wall of the receiver.

4. The device as claimed in claim 1, in which at least two retaining elements are provided, said retaining elements positively engaging in the receiver, said two retaining elements configured in a hook shape on the securing element and engaging in one respective recess of the receiver.

5. The device as claimed in claim 1, in which the camera unit is held immovably in the receiver.

6. The device as claimed in claim 1, in which the camera unit received in the receiver bears against walls of the receiver, the protection element, and the securing element, wherein the camera unit protrudes through an opening, wherein the opening is formed through the walls, the protection element and through the securing element.

7. The device as claimed in claim 6, in which at least one of the securing element and the receiver is adapted to an outer contour of the camera unit such that the camera unit is not able to be removed from the opening.

8. The device as claimed in claim 1, in which the fastening element has at least one first fastening element on the receiver and a second fastening element, wherein the at least one first fastening element and the second fastening element cooperate such that the securing element is able to be fastened in the receiver.

9. The device as claimed in claim 8, in which the first fastening element is a screw thread incorporated in the receiver, wherein the second fastening element engages in the screw thread as a screw element which extends through a bore of the securing element.

10. The device as claimed in claim 8, in which the securing element has two arms through which at least one of the at least one first fastening element and the second fastening element extends.

11. The device as claimed in claim 1, in which proceeding from the receiver, at least one pivoting element extends as far as a rotational axis of the protection element.

12. The device as claimed in claim 11, in which a drive drives a mechanism operatively connected to the pivoting element.

13. The device as claimed in claim 12, in which the drive is one of a linear drive and a rotary drive, wherein the drive has a crank rotatably mounted about a shaft, which is operatively connected to a lever.

14. The device as claimed in claim 12, in which the drive is arranged on the outside of the housing.

15. The device as claimed in claim 12, in which the mechanism has a lever movably mounted about the rotational axis and connected to the pivoting element fixedly in terms of rotation.

16. The device as claimed in claim 15, in which the lever is arranged on the outside of the housing.

17. The device as claimed in claim 11, in which the housing is fastenable to a vehicle body of a motor vehicle, said housing having an indentation in which the camera unit resides in the resting position.

18. The device as claimed in claim 17, in which at least one stop for the mechanism is provided for at least one of the open position and for the closed position, wherein for the closed position the stop is formed by the housing, on which the protection element acts, and for the open position the stop is formed by the housing on which the pivoting element acts.

19. A theft protection device for a camera unit of a motor vehicle, said theft protection device comprising:
  a movable protection element on which a camera unit for detecting images of an outer area can be arranged, wherein the protection element is movable between a closed position and an open position, in the closed position the camera unit is in a resting position and in the open position the camera unit is in an operating position;
  a receiver for the camera unit inside the protection element and on a side of the protection element remote from the outer area;
  a securing element, which reliably holds the camera unit in the receiver, is arranged on the receiver;
  at least one fastening element fastening the securing element inside of the protection element, wherein the fastening element is spaced apart from the protection element, such that in the open position of the protection element the fastening element is not able to be tampered with;
  at least one pivoting element proceeding from the receiver and extending as far as a rotational axis of the protection element; and
  a drive driving a mechanism operatively connected to the pivoting element the mechanism has a lever movably mounted about the rotational axis and connected to the pivoting element fixedly in terms of rotation, wherein the lever has a region which has a greater resilience than the remainder of the lever, wherein shortly before at least one of the open position and the closed position, a slight resilient deformation of the lever occurs, whereby in the subsequent one of the open position and the closed position, the protection element has vibration resistance, wherein in particular at least one of the region of the lever is narrowed and the region is located between the rotational axis and the drive.

\* \* \* \* \*

UNITED STATES PATENT AND TRADEMARK OFFICE
CERTIFICATE OF CORRECTION

PATENT NO. : 9,264,588 B2
APPLICATION NO. : 13/882796
DATED : February 16, 2016
INVENTOR(S) : Joachim Barthel It is certified that error appears in the above-identified patent and that said Letters Patent is hereby corrected as shown below:

In the Specification

Column 3, line 22: "an" should be --on--

In the Claims

Column 8, line 11: "arraned" should be --arranged--

Signed and Sealed this
Twenty-fourth Day of May, 2016

Michelle K. Lee
*Director of the United States Patent and Trademark Office*